US010688616B2

(12) United States Patent
Tsuno et al.

(10) Patent No.: US 10,688,616 B2
(45) Date of Patent: Jun. 23, 2020

(54) CUTTING APPARATUS

(71) Applicant: DISCO CORPORATION, Tokyo (JP)

(72) Inventors: Takahiko Tsuno, Tokyo (JP); Saki Miyakawa, Tokyo (JP); Tomoaki Sugiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 34 days.

(21) Appl. No.: 15/956,105

(22) Filed: Apr. 18, 2018

(65) Prior Publication Data

US 2018/0304429 A1 Oct. 25, 2018

(30) Foreign Application Priority Data

Apr. 21, 2017 (JP) .................................. 2017-084104

(51) Int. Cl.
*B23Q 17/09* (2006.01)
*B23Q 17/12* (2006.01)
*B26D 5/00* (2006.01)
*B24B 49/10* (2006.01)

(52) U.S. Cl.
CPC ......... *B23Q 17/0971* (2013.01); *B23Q 17/12* (2013.01); *B26D 5/005* (2013.01); *B23Q 2717/00* (2013.01); *B24B 49/10* (2013.01)

(58) Field of Classification Search
CPC ............... B23Q 17/0971; B23Q 17/12; B23Q 2717/00; B26D 5/005; B24B 29/10; B24B 49/10; B28D 5/0058; B28D 5/0094; B28D 5/023; H01L 21/67
See application file for complete search history.

(56) References Cited

U.S. PATENT DOCUMENTS

| 3,548,648 | A | * | 12/1970 | Grabkowski | B23Q 15/12 73/104 |
| 3,841,149 | A | * | 10/1974 | Edwin | G01N 3/58 73/659 |
| 4,087,801 | A | * | 5/1978 | Noh | B23B 49/001 340/680 |
| 4,220,995 | A | * | 9/1980 | Shoda | B23Q 17/09 340/683 |
| 4,478,538 | A | * | 10/1984 | Kakino | B23Q 15/12 340/683 |
| 4,636,779 | A | * | 1/1987 | Thomas | B23Q 17/0957 340/680 |
| 4,658,245 | A | * | 4/1987 | Dye | G05B 19/4065 340/683 |

(Continued)

FOREIGN PATENT DOCUMENTS

| JP | S5828451 | * | 2/1983 | ............ B23Q 17/09 |
| JP | 2000049120 | * | 2/2000 | ............ H01L 21/301 |

(Continued)

*Primary Examiner* — Robert E Fennema
*Assistant Examiner* — Jonathan Michael Skrzycki
(74) *Attorney, Agent, or Firm* — Greer Burns & Crain Ltd.

(57) ABSTRACT

A cutting apparatus having a cutting blade for cutting a workpiece held on a chuck table is disclosed. The cutting apparatus includes an elastic wave detecting sensor for detecting an elastic wave due to the rotation of the cutting blade, a reference data storing section configured to store reference data as a set of reference processing elastic wave data and reference idling elastic wave data, a threshold value storing section, a ratio calculating section, and a determining section.

11 Claims, 7 Drawing Sheets

(56) References Cited

U.S. PATENT DOCUMENTS

| | | | | |
|---|---|---|---|---|
| 4,736,625 A * | 4/1988 | Patterson | ............... | B24B 37/013 340/680 |
| 5,125,188 A * | 6/1992 | Ogawa | ............... | B23Q 11/0035 451/10 |
| 9,008,822 B2 * | 4/2015 | Wang | ..................... | B23Q 15/12 73/104 |
| 2004/0176926 A1 * | 9/2004 | Edie | .................. | B23Q 17/0971 702/179 |
| 2009/0030545 A1 * | 1/2009 | Masuya | ................. | B23Q 17/12 700/175 |
| 2011/0144794 A1 * | 6/2011 | Greenwald | ............ | B23Q 17/12 700/160 |
| 2015/0104930 A1 * | 4/2015 | Aikawa | ................... | H01L 21/78 438/462 |
| 2015/0183130 A1 * | 7/2015 | Gadd | ....................... | G01N 3/58 73/659 |
| 2015/0287179 A1 * | 10/2015 | Nomaru | .............. | G01N 21/9501 382/149 |
| 2015/0332928 A1 * | 11/2015 | Priewasser | ......... | G05B 19/4065 340/683 |
| 2016/0059370 A1 * | 3/2016 | Matsuyama | .......... | B24B 37/013 340/680 |
| 2016/0067819 A1 * | 3/2016 | Kuki | .................... | B23K 26/032 219/121.82 |
| 2016/0091887 A1 * | 3/2016 | Kubo | .................. | G05B 19/402 700/114 |
| 2018/0021908 A1 * | 1/2018 | Veittinger | ............ | G05B 19/402 700/114 |
| 2018/0174454 A1 * | 6/2018 | Tiwaree | ................. | G08G 1/148 |

FOREIGN PATENT DOCUMENTS

| | | | | |
|---|---|---|---|---|
| JP | 200712770 A | | 1/2007 | |
| JP | 2008132558 | * | 6/2008 | ............. B23Q 17/09 |
| JP | 2015170743 | * | 9/2015 | ............. B23Q 17/09 |
| JP | 2015170743 A | | 9/2015 | |
| RU | 1785832 | * | 1/1993 | ............. B23B 25/06 |
| SU | 1411640 | * | 7/1988 | ............... G01N 3/58 |

* cited by examiner

CUTTING APPARATUS

BACKGROUND OF THE INVENTION

Field of the Invention

The present invention relates to a cutting apparatus for cutting a workpiece by using a cutting blade.

Description of the Related Art

A platelike workpiece typified by a semiconductor wafer is cut by an annular cutting blade included in a cutting apparatus, for example, thereby dividing the workpiece into a plurality of chips. When any abnormality such as chipping of the cutting blade, a reduction in cutting performance, contact of the cutting blade with foreign matter, and a change in processing load occurs during the cutting of the workpiece, the cutting blade may vibrate. As a method of detecting such abnormality of the cutting blade, there has been proposed a method of detecting the chipping of the cutting blade by using an optical sensor (see Japanese Patent No. 4704816, for example) or a method of detecting a processing load by monitoring a current passing through a motor for driving a spindle.

In the method using the optical sensor as described in Japanese Patent No. 4704816, any abnormality other than the chipping of the cutting blade cannot be properly detected. Further, in the method monitoring the current passing through the motor for driving the spindle as mentioned above, various kinds of abnormality having an influence on the rotation of the cutting blade can be detected. However, since some measurement error is caused, this method is not suitable for the detection of slight abnormality. To cope with this problem, there has been proposed in Japanese Patent Laid-open No. 2015-170743 a cutting apparatus including vibration signal generating means for generating a vibration signal corresponding to the vibration of a cutting blade and control means for determining the condition of the cutting blade according to the vibration signal generated from the vibration signal generating means. In this cutting apparatus described in Japanese Patent Laid-open No. 2015-170743, any abnormality during cutting associated with the vibration of the cutting blade can be detected by the vibration signal generating means and the control means.

SUMMARY OF THE INVENTION

However, the detection method described in Japanese Patent Laid-open No. 2015-170743 has a problem such that a slight difference in condition of the cutting blade such as a difference in cutting edge height may be caused by production error of the cutting blade or wearing of the cutting blade and that this slight difference in condition of the cutting blade may cause variations in output value for the vibration signal generated from the vibration signal generating means. When such variations in output value are caused, it is difficult to set a threshold value to be compared with the output value in determining the circumstances of processing by the cutting blade. As a result, whether or not the processing circumstances are good cannot be accurately determined.

It is therefore an object of the present invention to provide a cutting apparatus which can stably determine whether or not the processing circumstances are good.

In accordance with an aspect of the present invention, there is provided a cutting apparatus including a chuck table for holding a workpiece; cutting means having a cutting blade for cutting the workpiece held on the chuck table; cutting water supplying means for supplying a cutting water to the cutting blade; an elastic wave detecting sensor provided in the cutting means for detecting an elastic wave due to the rotation of the cutting blade; and control means for controlling the chuck table, the cutting means, the cutting water supplying means, and the elastic wave detecting sensor; the control means including a reference data storing section configured to store reference data as a set of reference processing elastic wave data detected in previous processing of the workpiece under predetermined processing conditions and reference idling elastic wave data detected in the condition where the cutting blade is idling without cutting the workpiece and supplying the cutting water before processing, a threshold value storing section configured to store a threshold value set on the basis of the reference processing elastic wave data, an idling elastic wave data storing section configured to store idling elastic wave data detected in the condition where the cutting blade is idling without cutting the workpiece and supplying the cutting water, with arbitrary timing and also store the time of detection with the arbitrary timing, a ratio calculating section configured to calculate the ratio of the idling elastic wave data at the time just before processing to the reference idling elastic wave data, and a determining section configured to divide processing elastic wave data detected during processing by the ratio calculated by the ratio calculating section to thereby obtain a corrected value and then determine that the processing is abnormal when the corrected value is greater than the threshold value.

With this configuration, the processing elastic wave data detected in actually processing the workpiece is divided by the ratio calculated by the ratio calculating section to thereby obtain a corrected value. Then, this corrected value is compared with the threshold value to determine whether or not the actual processing is abnormal. Accordingly, a change in value detected by the elastic wave detecting sensor due to a difference in condition of the cutting blade can be corrected by using the ratio between the reference idling elastic wave data and the actual idling elastic wave data. Then, the corrected value for the processing elastic wave data can be compared with the threshold value. Accordingly, whether or not the processing circumstances are good can be determined accurately and stably.

Preferably, the arbitrary timing is the timing when the cutting blade is set up before processing the workpiece.

Preferably, the workpiece has division lines along which the workpiece is to be cut, and the arbitrary timing is the duration while the cutting blade having cut any one of the division lines of the workpiece is moved relative to a start point for the cutting of the next division line.

According to the present invention, the elastic wave data detected by the elastic wave detecting sensor during processing is corrected by using the ratio calculated by the ratio calculating section, and the resultant corrected value is compared with the threshold value. Accordingly, it can be determined whether the processing circumstances are good.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
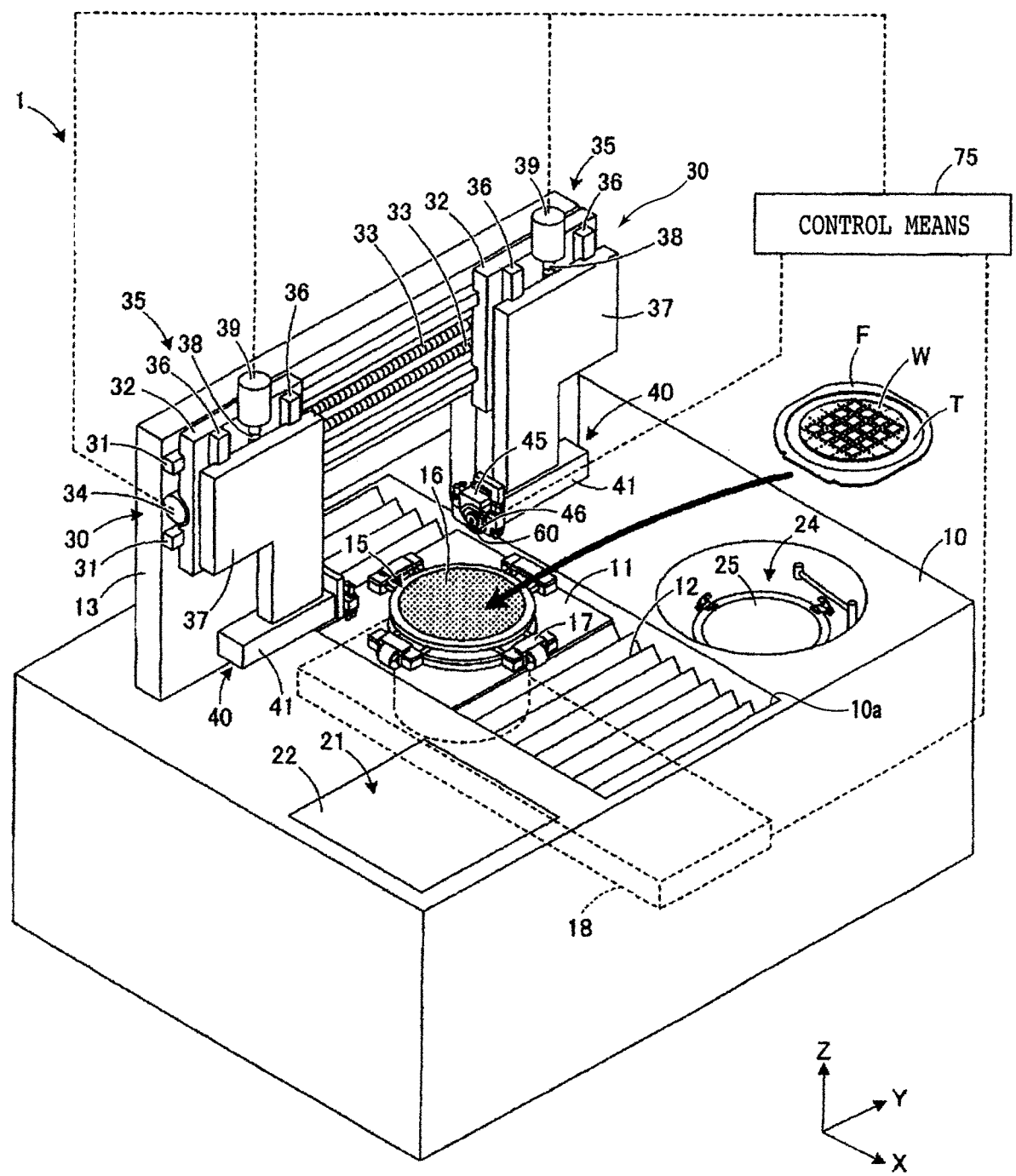
FIG. 1 is a perspective view of a cutting apparatus according to a preferred embodiment of the present invention.

There will now be described a cutting apparatus 1 according to a preferred embodiment of the present invention with reference to the attached drawings. FIG. 1 is a perspective view of the cutting apparatus 1 according to this preferred embodiment. The cutting apparatus 1 essentially has a structure capable of detecting an elastic wave generated in a cutting blade as in this preferred embodiment, and the configuration of the cutting apparatus 1 is not limited to that shown in FIG. 1.

As shown in FIG. 1, the cutting apparatus 1 is configured so that a cutting blade 60 and a chuck table 15 are relatively moved to thereby cut a workpiece W held on the chuck table 15 by using the cutting blade 60. The front side of the workpiece W is partitioned into a plurality of separate regions by a plurality of crossing division lines, and a plurality of devices are formed in these respective plural separate regions. The workpiece W is attached to a dicing tape T at a central portion thereof. A peripheral portion of the dicing tape T is mounted on a ring frame F. That is, the workpiece W is supported through the dicing tape T to the ring frame F so as to be surrounded by the ring frame F. The workpiece W thus supported through the dicing tape T to the ring frame F is loaded to the cutting apparatus 1.

The cutting apparatus 1 includes a base 10 having an upper surface. A rectangular opening 10a is formed on the upper surface of the base 10 at a central portion thereof. The rectangular opening 10a is elongated in the X direction shown by an arrow X in FIG. 1. This opening 10a is closed by a movable plate 11 and a bellows-like waterproof cover 12. The movable plate 11 is movable with chuck table 15 in the X direction. The bellows-like waterproof cover 12 can be expanded and contracted with the movement of the movable plate 11. The chuck table 15 has an upper surface, a part of which is formed as a porous holding surface 16 for holding the workpiece W under suction. That is, a vacuum is adapted to be applied to the holding surface 16. Four air-driven type clamps 17 are provided on the outer circumference of the chuck table 15. These clamps 17 are so configured as to hold the ring frame F around the workpiece W at four equally-spaced positions in the condition where the workpiece W is held on the holding surface 16. There is provided below the waterproof cover 12 lead screw type work feeding means 18 for feeding the chuck table 15 in the X direction.

Elevating means 21 and cleaning means 24 are provided on the upper surface of the base 10 at opposite positions with respect to the opening 10a in the Y direction shown by an arrow Y in FIG. 1. The elevating means 21 functions to mount a cassette (not shown) and to vertically move the cassette. The cleaning means 24 functions to clean the workpiece W after processing. The elevating means 21 has a stage 22 on which the cassette is adapted to be mounted. The stage 22 is vertically movable to thereby vertically move the cassette. Accordingly, the height of the workpiece W stored in the cassette can be adjusted in taking the workpiece W out of the cassette before processing or in storing the workpiece W into the cassette after processing. The cleaning means 24 includes a spinner table 25 for holding the workpiece W thereon after processing. The spinner table 25 is rotatable and vertically movable. In the operation of the cleaning means 24, the workpiece W held on the spinner table 25 is lowered into the base 10, and a cleaning water is sprayed toward the workpiece W held on the spinner table 25 as rotating the spinner table 25, thereby cleaning the workpiece W. Thereafter, dry air is blown against the workpiece W held on the spinner table 25 to thereby dry the workpiece W. Further, a double column type support frame 13 is provided on the upper surface of the base 10 so as to straddle the path of movement of the chuck table 15.

There are provided on the support frame 13 a pair of indexing means 30 for indexing a pair of cutting means 40 in the Y direction, individually, and a pair of cutter feeding means 35 for feeding the pair of cutting means 40 in the Z direction shown by an arrow Z in FIG. 1, individually. Each indexing means 30 has a pair of parallel guide rails 31 provided on the front surface of the support frame 13 so as to extend in the Y direction and a Y movable table 32 slidably mounted on the guide rails 31. Similarly, each cutter feeding means 35 has a pair of parallel guide rails 36 provided on the Y movable table 32 so as to extend in the Z direction and a Z movable table 37 slidably mounted on the guide rails 36.

The cutting means 40 for cutting the workpiece W is provided at the lower end of each Z movable table 37. A nut portion is formed on the back surface of each Y movable table 32, and a nut portion is also formed on the back surface of each Z movable table 37. A lead screw 33 is threadedly engaged with the nut portion of each Y movable plate 32, and a lead screw 38 is also threadedly engaged with the nut portion of each Z movable table 37. A drive motor 34 is connected to one end of the lead screw 33 for each Y movable table 32, and a drive motor 39 is connected to one end of the lead screw 38 for each Z movable table 37. Accordingly, by operating the drive motor 34 to rotate the lead screw 33, each cutting means 40 can be moved along the guide rails 31 in the Y direction. Further, by operating the drive motor 39 to rotate the lead screw 38, each cutting means 40 can be moved along the guide rails 36 in the Z direction.

Each cutting means 40 includes a spindle housing 41, a spindle 42 (see FIG. 2) rotatably supported to the spindle housing 41, and the cutting blade 60 mounted on the front end of the spindle 42. The cutting blade 60 is a disk-shaped member formed by binding diamond abrasive grains with a bond. A blade cover 45 is fixed to the spindle housing 41 so as to partially cover the outer circumference of the cutting blade 60. Further, the blade cover 45 is provided with cutting water supplying means 46 for supplying a cutting water to the cutting blade 60 in cutting the workpiece W. The cutting water supplying means 46 includes various nozzles for discharging the cutting water to the cutting blade 60 in cutting the workpiece W.

Figure 2:
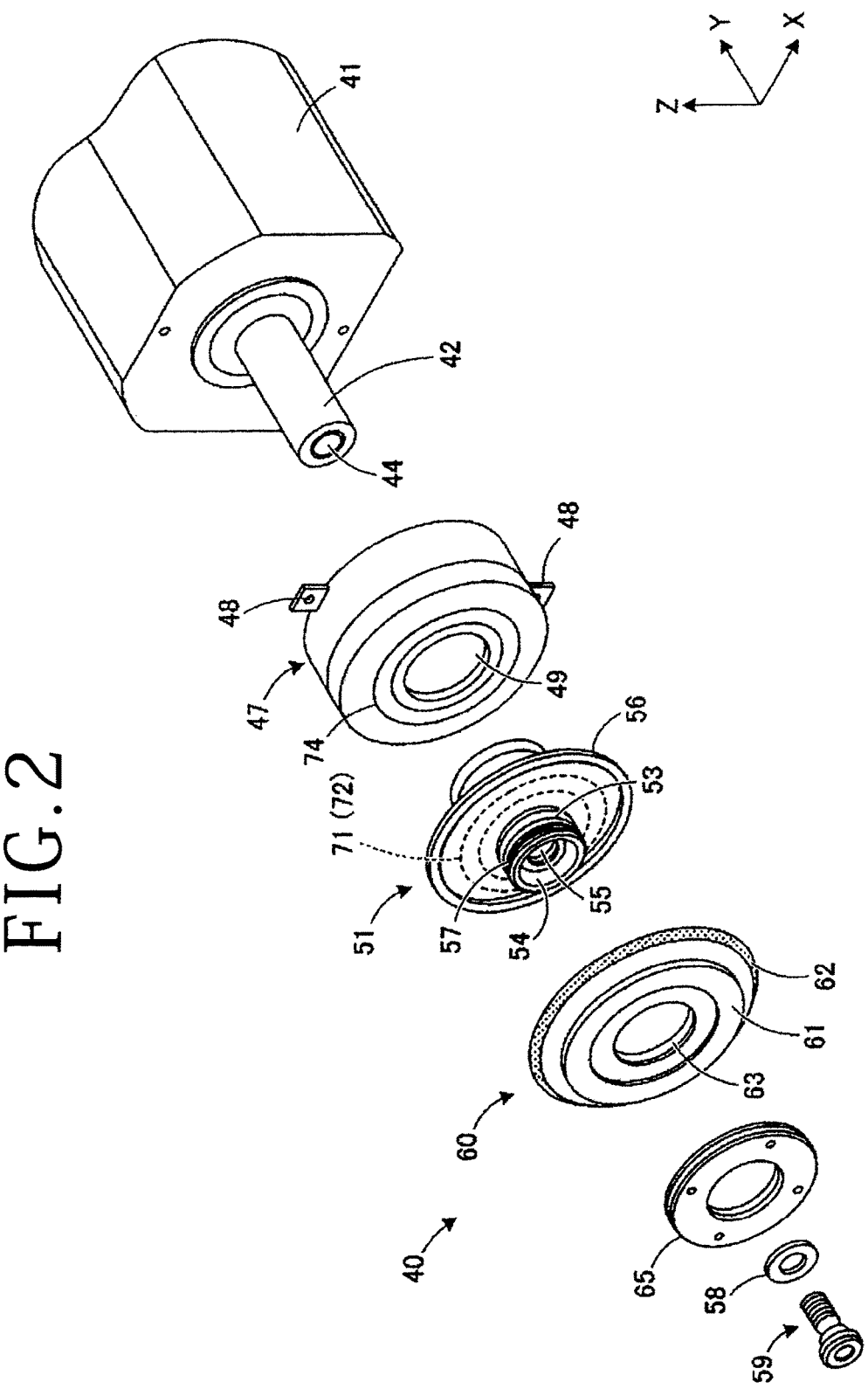
FIG. 2 is an exploded perspective view of cutting means included in the cutting apparatus shown in FIG. 1.
Figure 3:
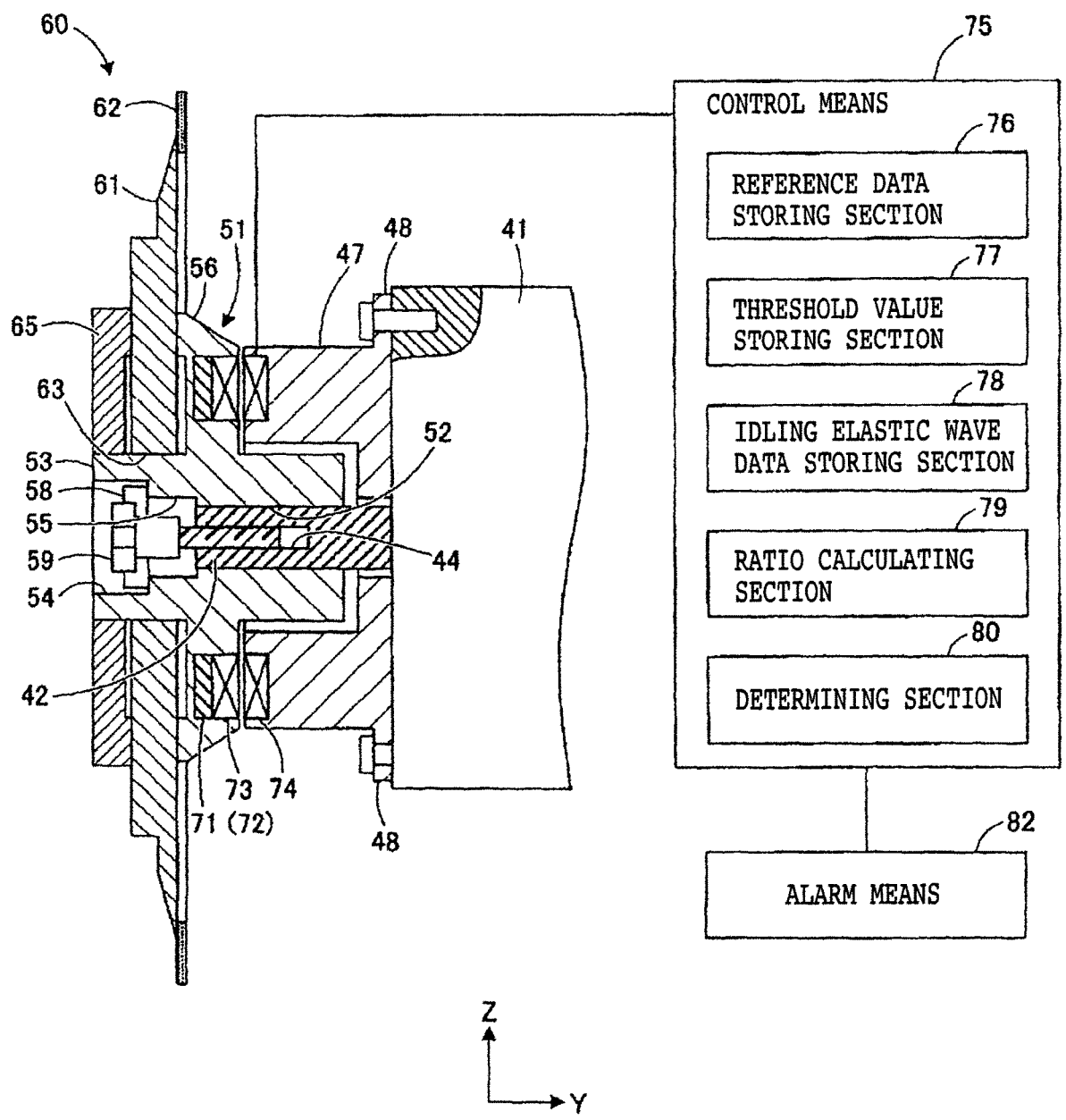
FIG. 3 is a sectional view of the cutting means shown in FIG. 2 in the condition where a cutting blade is fixed to a spindle.

Each cutting means 40 will now be described in more detail with reference to FIGS. 2 and 3. FIG. 2 is an exploded perspective view of each cutting means 40, and FIG. 3 is a sectional view of each cutting means 40. In FIGS. 2 and 3, the blade cover 45 for partially covering the outer circumference of the cutting blade 60 is not shown for convenience of illustration. Each cutting means 40 is essentially configured so that the cutting blade 60 can be mounted, and the configuration of each cutting means 40 is not limited to that shown in FIGS. 2 and 3.

As shown in FIG. 2, each cutting means 40 includes a blade mount 51 mounted on the front end of the spindle 42. The cutting blade 60 is mounted on this blade mount 51. The spindle 42 is an air spindle, for example, such that it is supported through a compressed air layer to the spindle housing 41 in a floating condition. A cover member 47 for covering the front end portion of the spindle 42 is mounted on the front end surface of the spindle housing 41. The cover member 47 has a pair of brackets 48, and it is mounted through the brackets 48 to the spindle housing 41 by means of screws. The cover member 47 has a central opening 49 for passing the front end portion of the spindle 42. Accordingly, when the cover member 47 is mounted on the front end surface of the spindle housing 41, the front end portion of the spindle 42 projects from the central opening 49 of the cover member 47.

The blade mount 51 for supporting the cutting blade 60 is mounted on the front end portion of the spindle 42. The blade mount 51 has an engaging hole 52 (see FIG. 3) on the back side, in which the front end portion of the spindle 42 is fitted in this engaging hole 52. The blade mount 51 has a cylindrical boss portion 53 on the front side. A circular recess 54 is formed on the front side of the boss portion 53, and a through hole 55 connected to the engaging hole 52 is formed on the bottom of this circular recess 54. Accordingly, the front end of the spindle 42 fitted to the engaging hole 52 of the blade mount 51 is exposed to the through hole 55. The front end of the spindle 42 is formed with a tapped hole 44, and a fixing bolt 59 is tightly engaged into the tapped hole 44 through a washer 58, thereby fixing the blade mount 51 to the spindle 42.

A flange portion 56 extends radially outward from the outer circumference of the boss portion 53 of the blade mount 51, and the cutting blade 60 is mounted on the blade mount 51 so as to be pressed on the flange portion 56. The cutting blade 60 is a hub blade composed of a substantially disk-shaped hub base 61 and an annular cutting edge 62 mounted on the outer circumference of the hub base 61. The hub base 61 has a central insertion hole 63 for insertion of the boss portion 53 of the blade mount 51. When the boss portion 53 is inserted through the insertion hole 63, the boss portion 53 projects from the hub base 61. A projecting end portion of the boss portion 53 projecting from the hub base 61 is formed with an external thread 57, and a fixing nut 65 is tightly engaged with this external thread 57 to thereby fix the cutting blade 60 to the blade mount 51.

Each cutting means 40 is provided with an elastic wave detecting sensor 71 capable of detecting an elastic wave generated in rotating the cutting blade 60. The elastic wave detecting sensor 71 is a so-called acoustic emission (AE) sensor, which includes a vibrator 72 for converting an elastic wave propagated to the blade mount 51 into an electrical change to output a detection signal indicating this electrical change. The elastic wave detecting sensor 71 is provided in the blade mount 51 near the cutting blade 60, so that the vibration from the cutting blade 60 is easily propagated. Accordingly, the vibration from the cutting blade 60 can be accurately detected by the elastic wave detecting sensor 71.

First coil means 73 is connected to the vibrator 72 and provided in the blade mount 51 (see FIG. 3). Further, second coil means 74 is provided in the cover member 47. For example, each of the first and second coil means 73 and 74 is an annular flat coil formed by winding a conductor. The first and second coil means 73 and 74 are magnetically coupled with each other, and the detection signal from the vibrator 72 is transmitted from the first coil means 73 to the second coil means 74 by mutual induction. In this manner, the detection signal is transmitted by the first and second coil means 73 and 74 in a noncontact fashion, so that the elastic wave detecting sensor 71 can be provided in the blade mount 51 to be rotated with the cutting blade 60.

In each cutting means 40, there is a case that a slight difference in condition of the cutting blade 60 such as a difference in cutting edge height may be caused by production error of the cutting blade 60 or wearing of the cutting blade 60. Since the vibration of the cutting blade 60 is accurately detected by the elastic wave detecting sensor 71, an output value for the elastic wave largely changes due to the difference in condition of the cutting blade 60. As a result, if the processing circumstances are determined according to elastic wave data output from the elastic wave detecting sensor 71 during processing, the accuracy of determination is low and must be improved.

To cope with this problem, the present inventors have examined storing reference processing elastic wave data and reference idling elastic wave data as a set of reference data and calculating the ratio between the reference processing elastic wave data and actual processing elastic wave data and the ratio between the reference idling elastic wave data and actual idling elastic wave data. As a result, it was found that the ratio between the reference processing elastic wave data and the actual processing elastic wave data is equal to or considerably approximate to the ratio between the reference idling elastic wave data and the actual idling elastic wave data. On the basis of this result, the cutting apparatus 1 according to this preferred embodiment is configured so that a threshold value is set according to the reference processing elastic wave data, and the ratio of idling elastic wave data just before processing to the reference idling elastic wave data is calculated. Further, the actual processing elastic wave data is corrected by this ratio, and a resultant corrected value is compared with the above threshold value. Accordingly, even when there is a slight difference in condition of the cutting blade 60, the threshold value can be set according to this slight difference. Further, since the actual processing elastic wave data can be corrected by the ratio, whether or not the processing circumstances are good can be determined stably and accurately.

As shown in FIG. 3, control means 75 for controlling each component of the cutting apparatus 1 (see FIG. 1) is connected to the elastic wave detecting sensor 71 through the magnetic coupling between the first and second coil means 73 and 74. The control means 75 includes a reference data storing section 76, a threshold value storing section 77, an idling elastic wave data storing section 78, a ratio calculating section 79, and a determining section 80.

Figure 4:
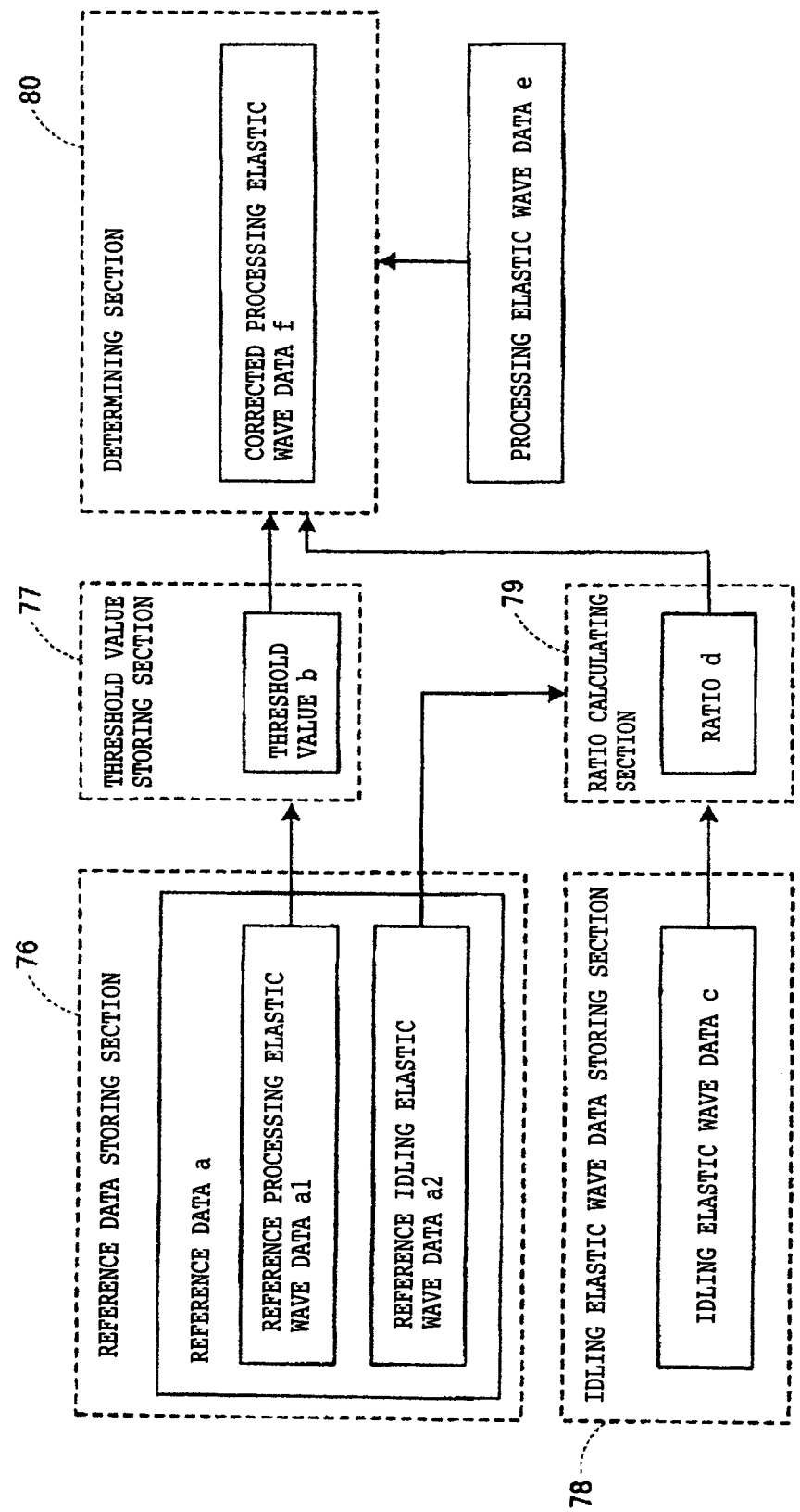
FIG. 4 is a block diagram showing the concept of a data structure in this preferred embodiment.
Figure 5A:
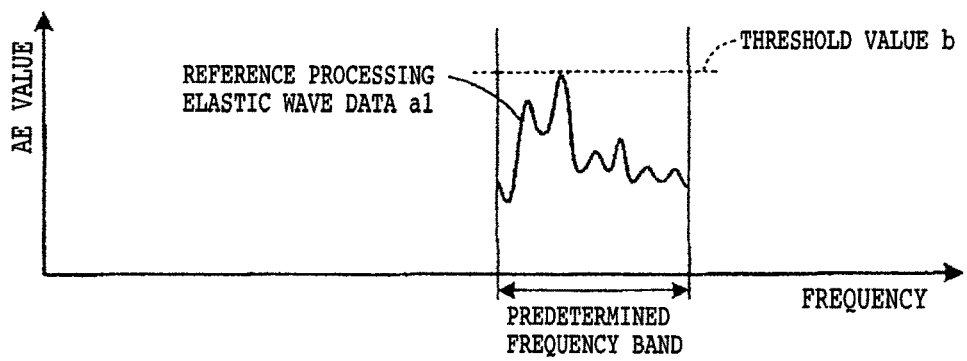
FIGS. 5A to 5C are graphs for illustrating elastic wave data in this preferred embodiment.

FIG. 4 is a block diagram showing the concept of a data structure in this preferred embodiment. As shown in FIG. 4, reference processing elastic wave data a1 and reference idling elastic wave data a2 are previously stored as a set of reference data a in the reference data storing section 76. The reference processing elastic wave data a1 is elastic wave data detected by the elastic wave detecting sensor 71 in previously processing the workpiece W (in the past). Further, the reference processing elastic wave data a1 is data detected in processing the workpiece W under predetermined processing conditions, specifically, under the conditions including the outer diameter, thickness, etc. of the cutting blade 60, the rotational speed of the spindle 42, the feed speed of the chuck table 15, and the supply amount of the cutting water in processing the workpiece W. In this preferred embodiment, the reference processing elastic wave data a1 is shown by a frequency spectrum in a predetermined frequency band (see FIG. 5A). The other various elastic wave data to be hereinafter described will be also similarly shown. The conversion to the frequency spectrum may be performed in the elastic wave detecting sensor 71 or in each section of the control means 75. The predetermined frequency band is a frequency band where when any abnormality is present in the processing circumstances in cutting the workpiece W by using the cutting blade 60, this abnormality appears as a change in AE value.

The reference processing elastic wave data a1 is elastic wave data detected in previously processing the workpiece W or elastic wave data detected in previously processing the workpiece W and corrected to be hereinafter described. A plurality of kinds of such data are previously stored in the reference data storing section 76. The reference processing elastic wave data a1 is data selectable as a reference in setting a threshold value b to be hereinafter described. The reference idling elastic wave data a2 is elastic wave data detected in the condition where the cutting blade 60 is idling (idly rotating) without cutting the workpiece W and supplying a cutting water, just before performing the cutting operation for detection of the reference processing elastic wave data a1.

The threshold value b is set on the basis of the reference processing elastic wave data a1, and this threshold value b is previously stored in the threshold value storing section 77. The threshold value b is set to a plurality of values corresponding individually to a plurality of kinds of the reference processing elastic wave data a1. For example, the threshold value b is a value set on the basis of an average value in the predetermined frequency band where the frequency spectrum of the reference processing elastic wave data a1 is shown (see FIG. 5A). As a modification, the threshold value b may be a value determined experimentally, empirically, or theoretically.

Idling elastic wave data c is stored in the idling elastic wave data storing section 78. The idling elastic wave data c is elastic wave (idling elastic wave) data detected by the elastic wave detecting sensor 71 in the condition where the cutting blade 60 is idling (idly rotating) without cutting the workpiece W and supplying a cutting water, with arbitrary timing. This idling elastic wave data c is stored together with the detection time with the above arbitrary timing. Examples of the above arbitrary timing include the setup timing before processing the workpiece W and the duration while the cutting blade 60 having cut any one of the division lines of the workpiece W is moved relative to a start point for the cutting of the next division line.

Figure 5B:
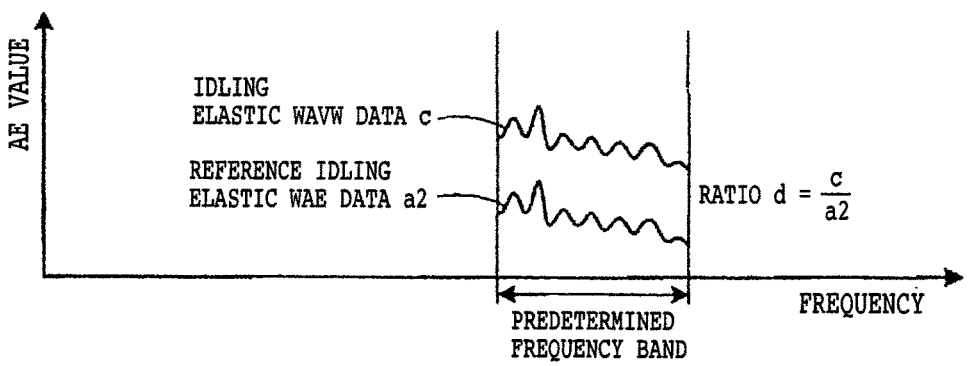

In the ratio calculating section 79, the reference idling elastic wave data a2 is compared with the idling elastic wave data c associated with the time just before the cutting required for the determination of a processed condition of the workpiece W. In making this comparison, the ratio d is calculated as d=(data c)/(data a2) (see FIG. 5B). In calculating the ratio d, an average value of the idling elastic wave data c and an average value of the reference idling elastic wave data a2 in the predetermined frequency band are used.

In the determining section 80, the ratio d calculated in the ratio calculating section 79 and processing elastic wave data e are input. The processing elastic wave data e is elastic wave data detected by the elastic wave detecting sensor 71 in performing the cutting required for the determination of a processed condition of the workpiece W. In other words, the processing elastic wave data e is elastic wave data detected in cutting the workpiece W just after detecting the idling elastic wave data c used in the ratio calculating section 79 to calculate the ratio d.

Figure 5C:
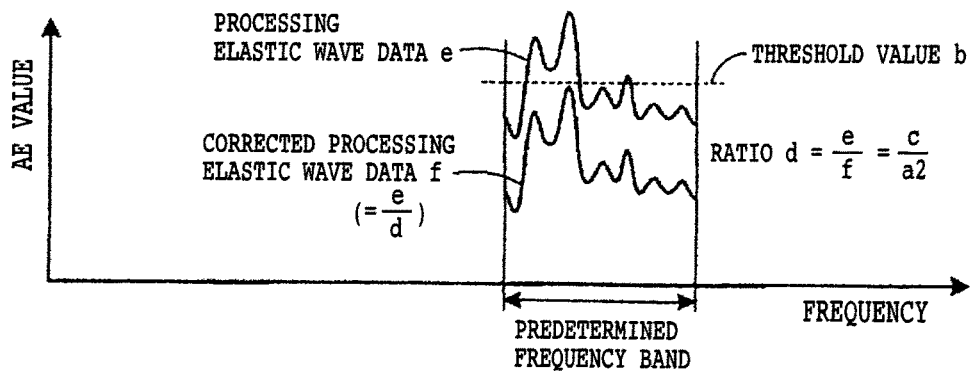

In the determining section 80, the processing elastic wave data e is divided by the ratio d to obtain corrected processing elastic wave data f (=e/d) (see FIG. 5C). In this calculation, an average value of the processing elastic wave data e in the predetermined frequency band is used. Thereafter, the corrected processing elastic wave data f and the threshold value b are compared with each other. In the case that an average value of the corrected processing elastic wave data f is greater than the threshold value b, it is determined that the processing is abnormal.

Further, the cutting apparatus 1 includes alarm means 82 (see FIG. 3) for alarming the abnormality determined by the determining section 80. When the alarm means 82 is operated, the operator of the cutting apparatus 1 can be informed of the situation that the processing is abnormal, and can be prompted to perform a maintenance operation. Each section of the control means 75 is configured by a processor for executing various kinds of processing, a memory, etc. The memory is configured by one or more storage media according to uses, such as read only memory (ROM) and random access memory (RAM). For example, the memory previously stores a program for controlling the operation of each component of the cutting apparatus 1 and a program for detecting the damage to the cutting blade.

Figure 6:
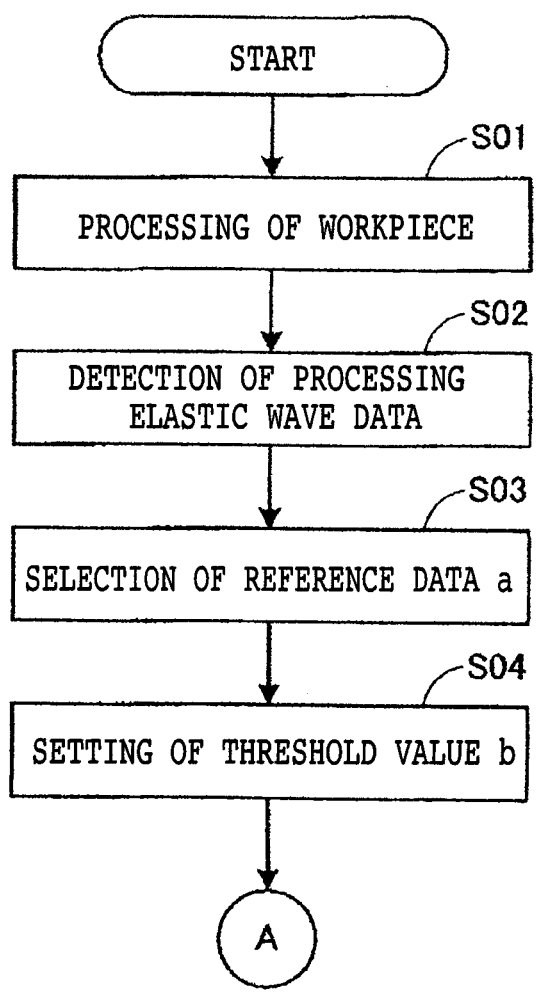
FIG. 6 is a flowchart showing the flow of a detecting method for any abnormality in a cutting operation.
Figure 7:
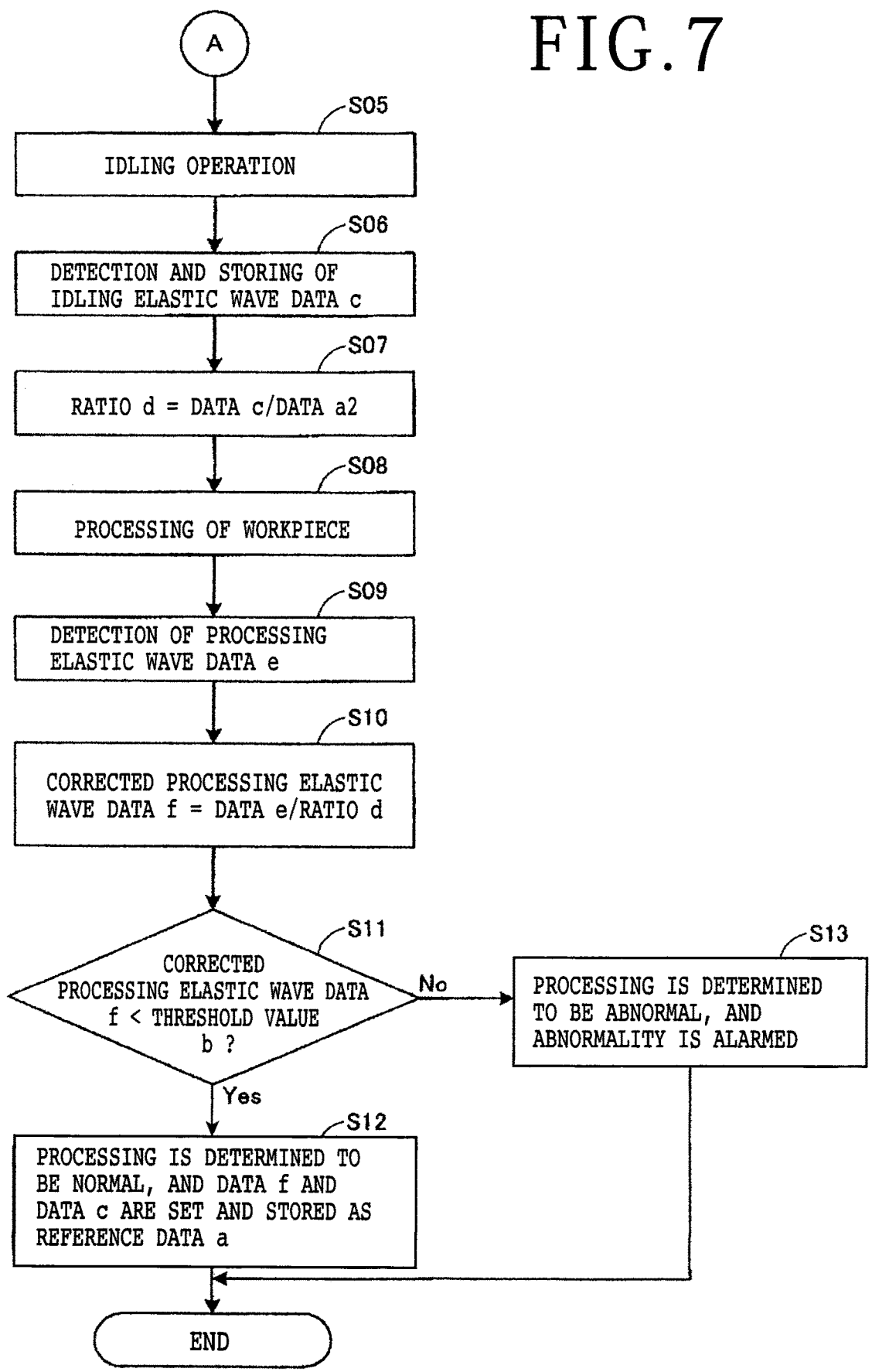
FIG. 7 is a flowchart following the flowchart shown in FIG. 6.

A method of detecting whether or not any abnormality is present in the cutting of the workpiece W will now be described with reference to FIGS. 6 and 7. FIGS. 6 and 7 are flowcharts showing the flow of the detecting method for the abnormality in the cutting. In this detecting method, it is assumed that a plurality of kinds of reference data a are previously stored in the reference data storing section 76 in a past cutting operation as shown in FIG. 4, in which the reference data a is composed of the reference processing elastic wave data a1 and the reference idling elastic wave data a2 which are stored as a set. Further, the threshold value b set on the basis of the reference processing elastic wave data a1 is previously stored in the threshold value storing section 77.

The workpiece W is cut by the cutting blade 60 (see FIG. 1) with predetermined timing (step 01, in which "step" will be hereinafter referred to simply as "S"). During this cutting operation, processing elastic wave data is detected by the elastic wave detecting sensor 71 (S02). Thereafter, according to this processing elastic wave data, the reference data a is selected (S03). The selection of the reference data a may be realized by executing a selection program in the control means 75 or by the operator confirming the result of the processing elastic wave data. After the reference data a is selected, the threshold value b set on the basis of the reference processing elastic wave data a1 of the reference data a is selected and set (S04).

After the threshold value b is set in the step S04, the program proceeds through the mark A in FIGS. 6 and 7 to the next step. That is, as shown in FIG. 7, the cutting blade

60 is rotated at idling in each cutting means 40 without cutting the workpiece W and supplying a cutting water (S05). In this condition, elastic wave data is detected by the elastic wave detecting sensor 71, and the result of this detection is stored as the idling elastic wave data c into the idling elastic wave data storing section 78 (S06). This idling elastic wave data c is associated with the time of detection with the detection timing.

After executing the step S06, the idling elastic wave data c is divided by the reference idling elastic wave data a2 of the reference data a selected in the step S03 to thereby obtain the ratio d (=c/a2) in the ratio calculating section 79 (S07), in which the idling elastic wave data c is associated with the time just before the cutting in the step S08 to be hereinafter described. After the ratio d is calculated, the workpiece W is cut by the cutting blade 60 (S08). During this cutting, the processing elastic wave data e is detected by the elastic wave detecting section 71 (S09).

Thereafter, the processing elastic wave data e is divided by the ratio d to thereby obtain the corrected processing elastic wave data f (=e/d) in the determining section 80 (S10). Thereafter, the corrected processing elastic wave data f is compared with the threshold value b (S11). If the corrected processing elastic wave data f is smaller than the threshold value b (S11: Yes), the determining section 80 determines that the processing is normal. Thereafter, the corrected processing elastic wave data f is newly used as the reference processing elastic wave data a1, and the idling elastic wave data c is newly used as the reference idling reference wave data a2 to thereby create new reference data a. This new reference data a is stored into the reference data storing section 76 to thereby accumulate or update the reference data a (S12). On the other hand, if the corrected processing elastic wave data f is not less than the threshold value b (S11: No), the determining section 80 determines that the processing is abnormal. Thereafter, the abnormality in the processing circumstances is informed to the operator by the alarm means 82 (see FIG. 3), so that the operator is prompted to perform a maintenance operation (S13).

According to the cutting apparatus 1 as described above, the threshold value b is set according to the reference processing elastic wave data a1, and the ratio d between the reference idling elastic wave data a2 and the idling elastic wave data c just before cutting is calculated. Then, the processing elastic wave data e during cutting is corrected by the ratio d, and the corrected processing elastic wave data f obtained is compared with the threshold value b. Accordingly, even when a slight difference in condition of the cutting blade 60 such as a difference in cutting edge height may be caused by production error of the cutting blade 60 or wearing of the cutting blade 60, the threshold value b can be set according to the actual circumstances. Furthermore, the corrected processing elastic wave data f to be compared with the threshold value b is obtained by dividing the processing elastic wave data e by the ratio d. Accordingly, by comparing the corrected processing elastic wave data f and the threshold value b in the determining section 80, whether or not the processing circumstances are good can be determined accurately and stably. For example, in the graph shown in FIG. 5C, the processing elastic wave data e before correction exceeds the threshold value b, whereas the corrected processing elastic wave data f does not exceed the threshold value b. That is, proper determination can be made.

Further, when the determining section 80 determines that the processing is normal, the reference data a is newly created from the data used in this determination and this new reference data a is stored. Accordingly, every time the processing is carried out, the accuracy of the reference data a can be improved or the number of data accumulated can be increased. As a result, the accuracy in obtaining the corrected processing elastic wave data f and the threshold value b can be improved to thereby contribute to the improvement in accuracy of the determination of the processing circumstances.

While an AE sensor is used as the elastic wave detecting sensor in this preferred embodiment, the elastic wave detecting sensor is not limited in the present invention. That is, the elastic wave detecting sensor may be any sensor capable of detecting an elastic wave. For example, a vibration sensor may be used. Further, the AE sensor may be of any type such as a resonance type AE sensor that can obtain high sensitivity at a specific frequency, a wide-band type AE sensor that can obtain constant sensitivity in a wide band, and a preamplifier built-in type AE sensor having a built-in preamplifier. The resonance type AE sensor may include a plurality of vibrators (piezoelectric elements) having different resonance frequencies, in which any of these vibrators may be suitably selected according to the processing conditions or the like.

The vibrator in the elastic wave detecting sensor is formed of ceramic such as barium titanate ($BaTiO_3$), lead zirconate titanate ($Pb(Zr,Ti)O_3$), lithium niobate ($LiNbO_3$), and lithium tantalate ($LiTaO_3$).

The dicing tape may be a usual adhesive tape composed of a base sheet and an adhesive layer formed on the base sheet or may be a die attach film (DAF) tape composed of a base sheet and a DAF attached to the base sheet. Further, the alarm means may be of any type capable of alarming the damage of the cutting blade, such as a sound alarm type, light alarm type, and display alarm type.

Further, while the vibrator of the elastic wave detecting sensor is mounted in the blade mount in this preferred embodiment, the present invention is not limited to this configuration. The vibrator of the elastic wave detecting sensor may be located at any position where the vibration of the cutting blade can be easily propagated, such as the blade cover and the spindle.

Further, while the cutting apparatus in this preferred embodiment is a cutting apparatus for cutting a workpiece into individual device chips, the present invention is not limited to this configuration. The cutting apparatus according to the present invention may be another cutting apparatus required to have a cutting blade, such as an edge trimming apparatus and a cluster system including a cutting apparatus.

Further, the workpiece to be processed by the cutting apparatus may be any workpiece according to the kind of processing, such as a semiconductor device wafer, an optical device wafer, a package substrate, a semiconductor substrate, an inorganic material substrate, an oxide wafer, a green ceramic substrate, and a piezoelectric substrate. The semiconductor device wafer may be a silicon wafer or a compound semiconductor wafer on which devices are formed. The optical device wafer may be a sapphire wafer or a silicon carbide wafer on which devices are formed. The package substrate may be a chip size package (CSP) substrate. The semiconductor substrate may be a silicon substrate or a gallium arsenide substrate. The inorganic material substrate may be a sapphire substrate, a ceramic substrate, or a glass substrate. The oxide wafer may be a lithium tantalate wafer or a lithium niobate wafer on which devices are formed or to be formed.

Further, while the cutting blade in this preferred embodiment is a hub blade composed of a hub base and an annular cutting edge fixed to the hub base, the cutting blade in the present invention is not limited to this configuration. That is, the cutting blade may be a hubless type washer blade. Further, while the chuck table in this preferred embodiment is a suction chuck type table, the chuck table may be an electrostatic chuck type table.

Further, the present invention is not limited to the above preferred embodiment, but various modifications, replacements, and changes may be made within the scope of the present invention. Further, if the technical idea of the present invention can be realized by any other methods using any technical progress or derivative techniques, the present invention may be embodied by using these methods. Accordingly, the present invention claimed herein is intended to cover all embodiments that may fall within the scope of the present invention.

Further, while the present invention is applied to a cutting apparatus in the above preferred embodiment, the present invention is also applicable to any other processing apparatus for detecting potential trouble in a processing tool.

As described above, the present invention has an effect such that whether or not the processing circumstances are good can be stably determined. In particular, the present invention is useful as a cutting apparatus for cutting a workpiece along division lines.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
a chuck table configured to hold a workpiece;
cutting means having a cutting blade for cutting said workpiece held on said chuck table;
cutting water supplying means for supplying a cutting water to said cutting blade;
an elastic wave detecting sensor provided in said cutting means for detecting an elastic wave due to the rotation of said cutting blade;
and control means for identifying abnormal processing of the cutting means, said control means comprising a processor and memory;
said control means including:
a reference data storing section configured to store reference data as a set of reference processing elastic wave data detected in previous processing of one or more prior workpieces under predetermined processing conditions and reference idling elastic wave data detected in previous processing in the condition where said cutting blade is idling without cutting said one or more prior workpieces and supplying said cutting water before processing,
a threshold value storing section configured to store a threshold value set on the basis of an average value in a predetermined frequency band of said reference processing elastic wave data,
an idling elastic wave data storing section configured to store idling elastic wave data detected in the predetermined frequency band in the condition where said cutting blade is idling without cutting said workpiece and supplying said cutting water for a period of time and to store the period of time of detection,
a ratio calculating section configured to calculate a first ratio of an average value of said idling elastic wave data at the period of time in the predetermined frequency band to an average value of said reference idling elastic wave data in the predetermined frequency band,
and a determining section configured to divide an average value of processing elastic wave data detected during processing of said workpiece in the predetermined frequency band by said first ratio to thereby obtain a corrected processing elastic wave data value and then determine that the processing is abnormal when said corrected processing elastic wave data value is greater than said threshold value.

2. The cutting apparatus of claim 1, wherein the period of time comprises a time when said cutting blade is rotating at a speed in which cutting will be performed before processing said workpiece.

3. The cutting apparatus according to claim 1, wherein said workpiece has division lines along which said workpiece is to be cut, and the period of time comprises a time while said cutting blade having cut any one of said division lines of said workpiece is moved relative to a start point for the cutting of the next division line.

4. The cutting apparatus according to claim 1, wherein the cutting water supplying means comprises a nozzle for discharging cutting water.

5. The cutting apparatus according to claim 1, wherein the elastic wave detecting sensor comprises an acoustic emission sensor or a vibration sensor.

6. The cutting apparatus according to claim 1, wherein the elastic wave detecting sensor comprises a resonance type acoustic emission sensor, a wide-band type acoustic emission sensor, or a pre-amplifier built-in type acoustic emission sensor.

7. The cutting apparatus according to claim 1, wherein the elastic wave detecting sensor comprises a resonance type acoustic emission sensor having a plurality of vibrators having different resonance frequencies.

8. The cutting apparatus according to claim 1, wherein the elastic wave detecting sensor comprises a vibrator formed of a ceramic.

9. The cutting apparatus according to claim 8, wherein the ceramic comprises barium titanate, lead zirconate titanate, lithium niobate, or lithium tantalite.

10. The cutting apparatus according to claim 1, further comprising first and second annular coils magnetically coupled with the elastic wave detecting sensor.

11. The cutting apparatus according to claim 1, further comprising an alarm connected to said control means for indicating when said corrected value is greater than said threshold value.

* * * * *